F. GAHM.
AUTOMOBILE SEAT.
APPLICATION FILED NOV. 30, 1921.

1,427,280.

Patented Aug. 29, 1922.

Inventor
Frank Gahm.
By Tillson Tilla
Attorneys

UNITED STATES PATENT OFFICE.

FRANK GAHM, OF STREATOR, ILLINOIS.

AUTOMOBILE SEAT.

1,427,280.  Specification of Letters Patent.  Patented Aug. 29, 1922.

Application filed November 30, 1921. Serial No. 518,899.

*To all whom it may concern:*

Be it known that I, FRANK GAHM, a citizen of the United States, and resident of Streator, county of La Salle, and State of Illinois, have invented certain new and useful Improvements in Automobile Seats, of which the following is a specification and which are illustrated in the accompanying drawings, forming a part thereof.

The invention relates to seats for automobiles. An object of the invention is to provide a hinged mounting for such a seat which will enable one to quickly and easily swing the seat forward out of the way of the side door. A further object is to provide means whereby the seat may readily be converted into a cot which may be used for sleeping purposes.

In the accompanying drawings.

Figure 1:
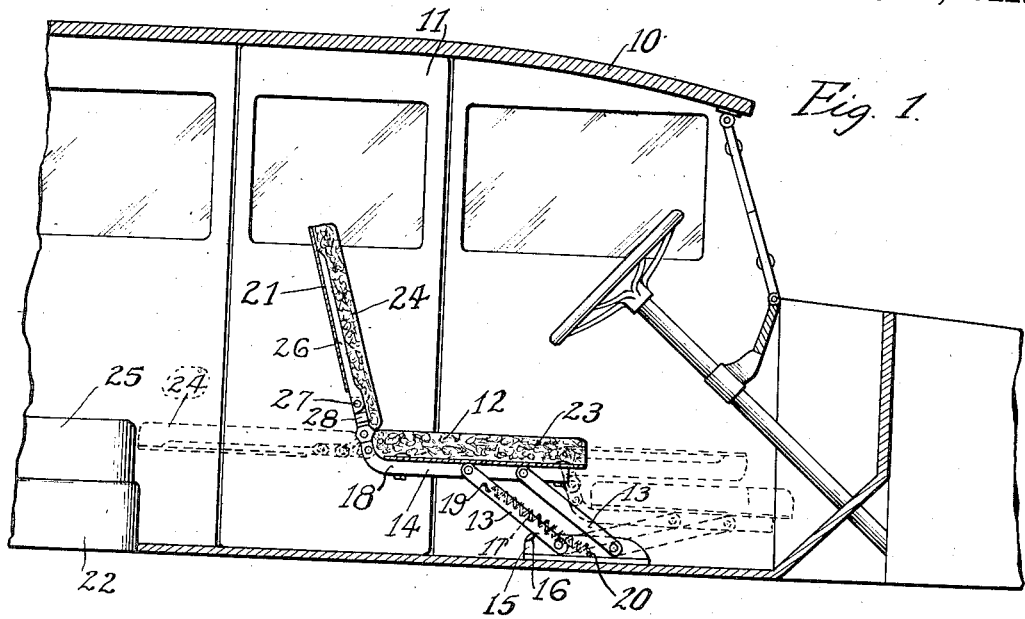
Fig. 1 is a view in side elevation showing the improved seat, and a portion of the interior of the automobile in connection with which it is adapted to be used, the normal position of the seat being shown in full lines and other positions being indicated in dotted lines.
Figure 2:
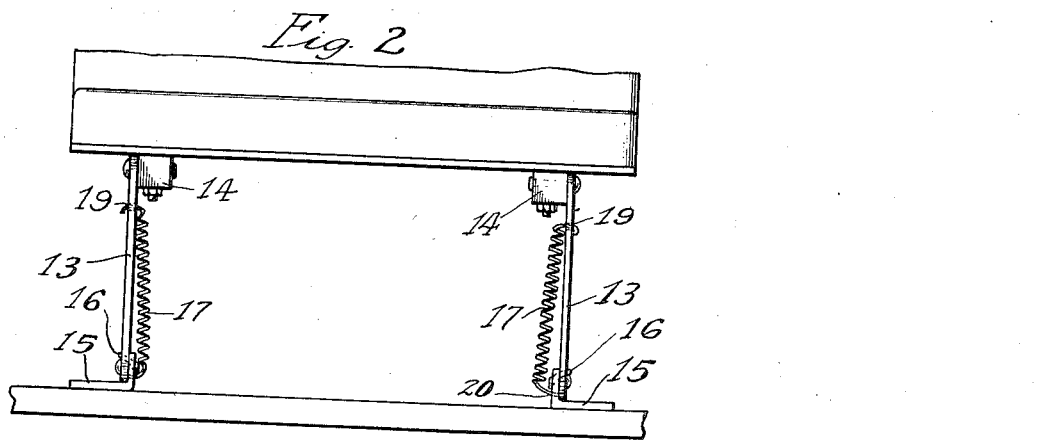
Fig. 2 is a front view of a hinged frame on which the seat is mounted, a portion only of the seat being shown.

Referring particularly to Fig. 1, the car body is designated generally by the reference numeral 10, and is shown as provided with the customary side doors, one of which is indicated by the reference numeral 11. A front seat 12 is shown as normally projecting backward so as to partially obstruct the doorway. In order to avoid inconvenience to persons who desire to occupy the rear seats it is proposed to mount the seat 12 upon a swinging frame 18, whereby the seat may be readily shoved forward out of the way, thus allowing free access to the rear of the car.

As shown, the frame 18 comprises a plurality of parallel hinged links 13, two of which may be located on each side of the seat. Each link 13 is hinged at its upper end to a lower frame member 14, which forms part of the seat, and at its lower end to one of a pair of bracket members 15 which may be secured to the floor of the automobile. The forward movement of the seat is limited by the engagement of the rear pair of hinged links with the front pair, as indicated in the dotted position in Fig. 1. Rearward movement beyond the desired normal position may be prevented by bending outwardly a portion of the bracket members 15 to form stops 16 for the rear pair of links 13. In order to facilitate the forward movement of the seat a spring 17 may be attached at one end to some portion of the swinging frame 18, as at 19, its other end being secured to the car body at a point 20 in advance of the point 19.

The improved seat 12 may be provided with a hinged back 21, which may be swung forward and downwardly to the horizontal position when the seat 12 is not in use, or may be swung rearwardly to the horizontal position, forming an extension of the rear seat 22, thus providing a convenient cot for sleeping purposes. In this position the upper surfaces of the cushions 23, 24 and 25, located, respectively, on the front seat 12, the hinged back 21 and the rear seat 22, are in horizontal alignment.

Each of the frame members 26 of the back 21 is shown as hinged at 27 to a link 28, the hinge being such as to permit the back 21 to swing forward but not rearwardly about the hinge 27, which should be located high enough to prevent the cushions 23, 24, interfering with the swinging movement. Each link 28 is hinged, as at 29, to the upwardly curved end 41 of the corresponding lower frame member 14 of the seat 12, the hinge 29 permitting swinging movement in either direction.

Figure 3:
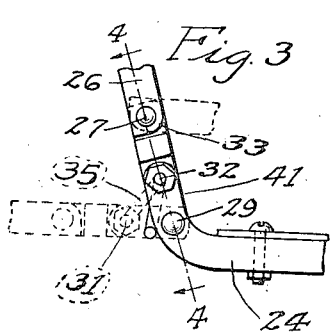
Fig. 3 is a detail side view showing a portion of the hinged back, full lines indicating the normal position and dotted lines indicating other positions of the back.
Figure 4:
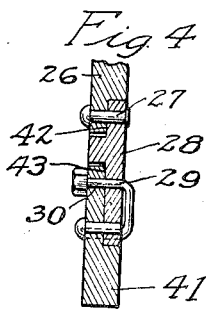
Fig. 4 is a detail section on the line 4—4 of Fig. 3.

While other forms of hinges may be employed, a convenient form is illustrated in Figs. 3 and 4, wherein the ends of the frame members 41 and 26 are cut away, as at 42 and 43, respectively, the connecting link 28 being T-shaped, the head of the T fitting the cut away portions of the frame members. The forward portion of the lower end of the frame member 26 may be cut away, as at 33, as shown in Fig. 3, thus permitting forward movement only of the back. The lower end of the link 28 is rounded, permitting either forward or rearward rotation about the hinge 29.

A U-shaped bolt 30, adapted to pass through apertures 31, 32, in the head of the T-link 28 and the upturned ends 41 of the frame members 14, respectively, as shown in Fig. 4, serves to normally prevent rotation about the hinge 29. When it is desired to employ the seat as a cot, the bolt 30 may be removed, the back 21 swung rearwardly about the hinge 29 to horizontal position. One leg of the U-bolt 30 is then passed through the aperture 31 in the link 28, while the other leg is passed through the aperture 32, the intermediate portion 35 serving as a link and being of such length that the back is held in horizontal position.

Figure 5:
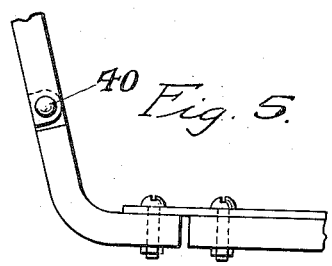
Fig. 5 is a side view showing a modified form of back.

Fig. 5 illustrates a modified construction which may be employed where it is not thought necessary to use the convertible form of seat, the back being then provided with a single hinge 40 permitting forward swinging movement only.

I claim as my invention—

1. In an automombile or other vehicle, a rear seat, a front seat comprising an underframe and a hinged back normally in upright position but adapted to be swung forwardly or rearwardly to horizontal position, cushions for said underframe, back and rear seat, said back having two hinges, one located below the upper level of the front cushion and permitting rearward swinging of the back to horizontal position and the other located above the upper level of said cushion and permitting the back to swing forwardly to horizontal position, and means for securing the back in either upright or rearward position, the cushions on said seats and back forming a cot in said latter position.

2. A convertible seat for vehicles adapted to be swung forwardly or rearwardly comprising, in combination, an underframe, a swinging mounting pivoted to said underframe and to the floor of the vehicle, means for limiting the swinging movement in either direction, a hinged back normally in upright position and adapted to be swung forwardly or rearwardly to horizontal position, and means for securing said back in its upright and rear positions.

FRANK GAHM.